United States Patent [19]
Kow

[11] Patent Number: 5,883,728
[45] Date of Patent: Mar. 16, 1999

[54] OPTICAL SCANNER USING THROUGH HOLES TO SHOW SCANNING PROGRESS

[75] Inventor: David Kow, Hsinchu, Taiwan

[73] Assignee: Spot Technology Inc., Hsinchu Hsien, Taiwan

[21] Appl. No.: 859,123

[22] Filed: May 20, 1997

[51] Int. Cl.⁶ .............................. H04N 1/10; H04N 1/193
[52] U.S. Cl. ............................................ 358/494; 358/497
[58] Field of Search ...................................... 358/474, 473, 358/475, 488, 40.1, 400, 471, 487, 497, 494; 399/206, 208, 209, 211, 212; 250/234, 235

[56] References Cited

U.S. PATENT DOCUMENTS 5,251,072  10/1993  Fukuoka et al. ........................ 359/896
5,754,713  5/1998  Deguchi et al. ........................ 358/473

*Primary Examiner*—Joseph Mancuso
*Assistant Examiner*—Hien Truong

[57] ABSTRACT

An optical scanner in which a row of through holes are mounted on the top side of the housing of the optical scanner outside the scanning area, light from the light source of the scanning mechanism passes through the through hole from one to another to show the progress of the scanning operation during a scanning operation.

2 Claims, 3 Drawing Sheets

OPTICAL SCANNER USING THROUGH HOLES TO SHOW SCANNING PROGRESS

BACKGROUND OF THE INVENTION

The present invention relates to optical scanners, and more particularly to such an optical scanner which lets the light of the light source of its scanning mechanism pass through a row of through holes to show the progress of the scanning.

A variety of optical scanners have been disclosed, and have appeared on the market. These optical scanners are functionality, however they have no means to indicate the progress of the scanning when scanning a document. Because the operator cannot know the progress of the scanning as scanning a document, the operator cannot utilize the vacant hours to do everything he like during a scanning cycle.

SUMMARY OF THE INVENTION

The present invention has been accomplished under the circumstances in view. According to the present invention, a row of through holes are mounted on the top side of the housing of the optical scanner outside the scanning area. When scanning a document, light from the light source of the scanning mechanism passes through the through hole from one to another to show the progress of the scanning operation, so the operator can utilize the vacant hours to do his affairs during each scanning cycle.

DETAILED DESCRIPTION OF THE PREFERRED EMBODIMENT

Figure 1:
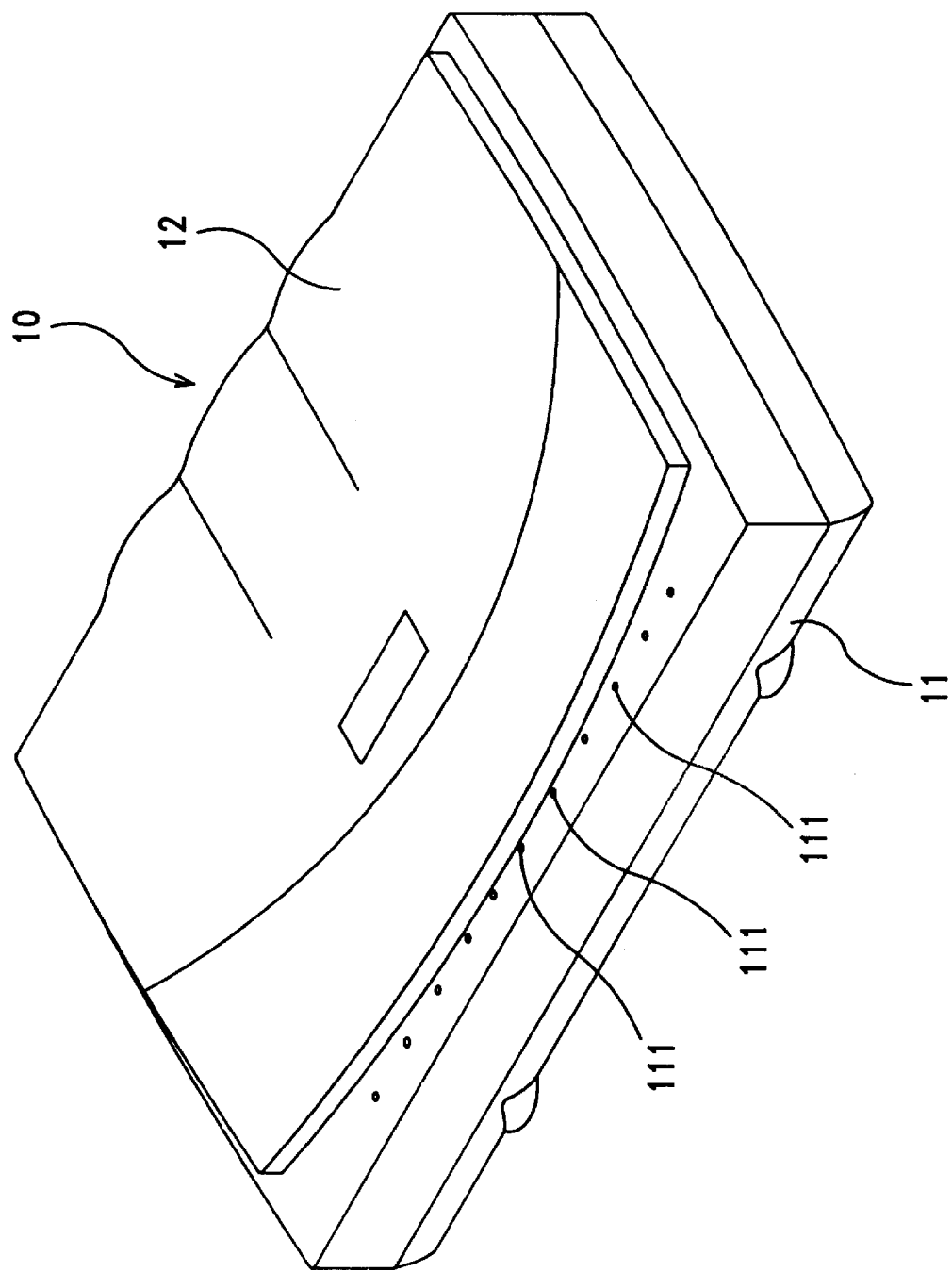
FIG. 1 is an elevational view of an optical scanner according to the present invention.
Figure 2:
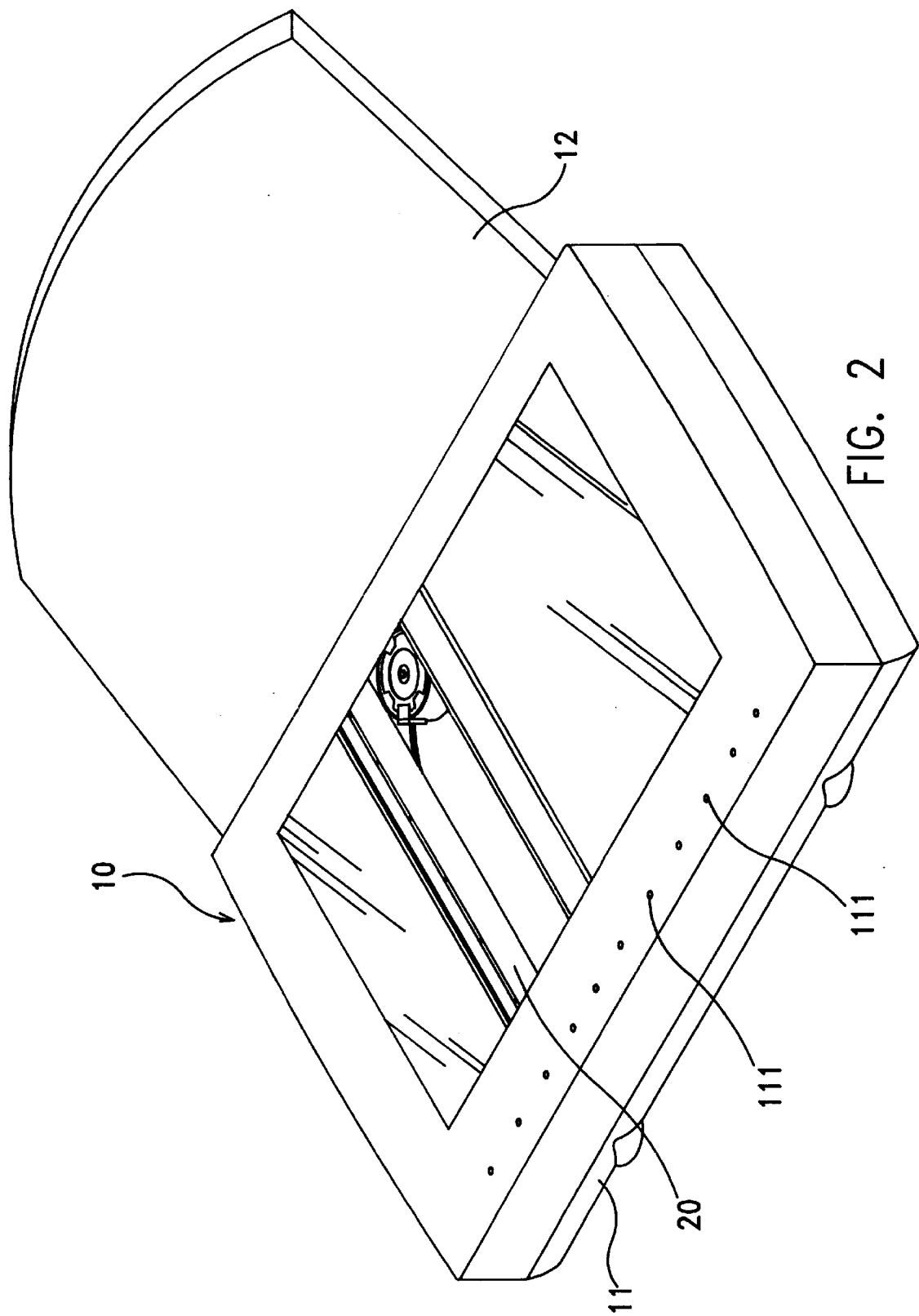
FIG. 2 shows the cover of the optical scanner opened according to the present invention.
Figure 3:
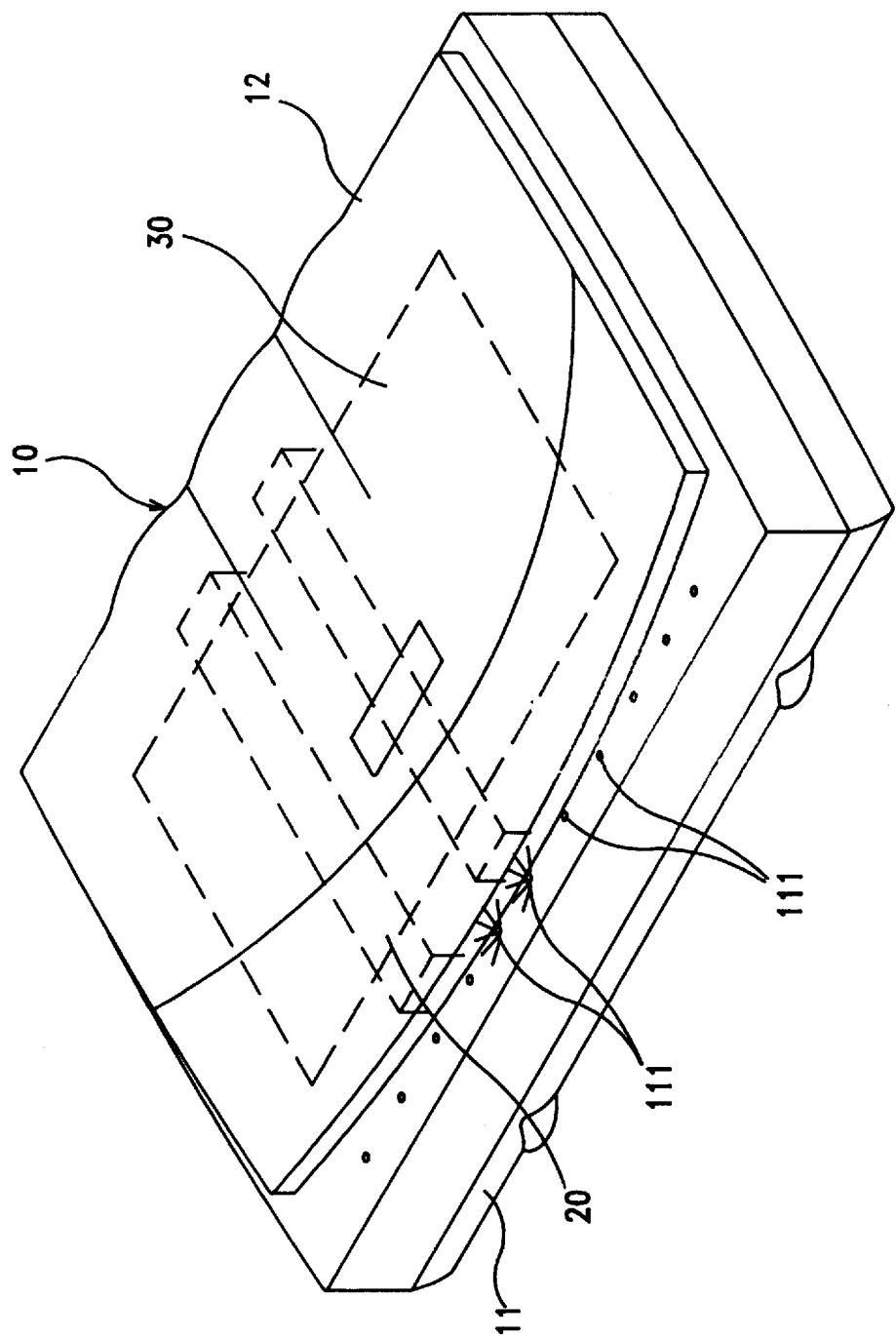
FIG. 3 is a schematic drawing of the present invention, showing a scanning operation of the optical scanner.

Referring to FIGS. from 1 to 3, an optical scanner 10 in accordance with the present invention comprises a housing 11 having a transparent scanning area with a top side thereof, a driving mechanism (not shown), a scanning mechanism comprised of a light source (not shown) and an image sensor 20, and a cover 12 pivoted to the housing 11 and adapted to cover the top side of the housing 11. The housing 11 comprises a row of through holes 111 arranged on the outside margin of the top side which adjacent to its front side and disposed outside the covering area of the cover 12 (the transparent scanning area of the housing 11). When a document 30 is put on the top side of the transparent scanning area of the housing 11 of the optical scanner 10, and the image sensor 20 and the light source of the scanning mechanism by the driving mechanism is moved to pick up the image of the document 30. Light from the light source of the scanning mechanism (not shown) of the optical scanner 10 passes through the through holes 111 from one to another in proper order corresponding to the displacement of the image sensor 20. Therefore, by means of observing the movement of the light through the through holes 111, the user knows the progress of the current scanning operation and can fully utilize the vacant hours to do his affairs before one scanning cycle is finished. When the light of the light source of the scanning mechanism passes through the last through hole 111, the user immediately knows that one scanning cycle is finished, therefore he can stop the scanning operation or start to scan another document without wasting time.

It is to be understood that the drawings are designed for purposes of illustration only, and are not intended as a definition of the limits and scope of the invention disclosed. For example, the aforesaid row of through holes 111 can be mounted on the cover 12 near its front edge, so that light passes through the through holes 111 on the cover 12 in proper order to show the progress of a scanning operation.

What the invention claimed is:

1. An optical scanner comprising a housing having a transparent scanning area within a top side thereof, a driving mechanism, a scanning mechanism comprised of a light source and an image sensor and moved by said driving mechanism to pick up image of a document which have been put on said transparent scanning area of said top side of said housing, and a cover pivoted to said housing and covered on said transparent scanning area of said housing over said document, wherein said housing comprises a row of through holes arranged on said top side along a front edge thereof outside said transparent scanning area through which light from said light source passes through said through holes in proper order during a scanning operation.

2. An optical scanner comprising a housing having a transparent scanning area within a top side thereof, a driving mechanism, a scanning mechanism comprised of a light source and an image sensor and moved by said driving mechanism to pick up image of a document which have been put on said transparent scanning area of said top side of said housing, and a cover pivoted to said housing and covered on said transparent scanning area of said housing over said document, wherein said cover comprises a row of through holes arranged along a front edge thereof through which light from said light source passes through said through holes in proper order during a scanning operation.

* * * * *